(12) United States Patent
Fuse

(10) Patent No.: US 8,758,916 B2
(45) Date of Patent: Jun. 24, 2014

(54) ENERGY STORAGE APPARATUS

(75) Inventor: Kenichi Fuse, Hadano (JP)

(73) Assignee: Empire Technology Development LLC, Wilmington, DE (US)

( * ) Notice: Subject to any disclaimer, the term of this patent is extended or adjusted under 35 U.S.C. 154(b) by 544 days.

(21) Appl. No.: 13/062,516

(22) PCT Filed: Oct. 29, 2010

(86) PCT No.: PCT/US2010/054735
§ 371 (c)(1),
(2), (4) Date: Mar. 6, 2011

(87) PCT Pub. No.: WO2012/057787
PCT Pub. Date: May 3, 2012

(65) Prior Publication Data
US 2012/0105835 A1  May 3, 2012

(51) Int. Cl.
*H01M 10/48* (2006.01)
*H01M 10/42* (2006.01)

(52) U.S. Cl.
CPC .......... *H01M 10/425* (2013.01); *H01M 10/486* (2013.01)
USPC .......................... 429/90; 356/237.1

(58) Field of Classification Search
CPC .................... H01M 10/425; H01M 10/486
USPC ............................ 429/90; 356/237.1
See application file for complete search history.

(56) References Cited

U.S. PATENT DOCUMENTS

| | | | |
|---|---|---|---|
| 3,950,075 A * | 4/1976 | Cook et al. ...................... | 385/93 |
| 4,342,907 A | 8/1982 | Macedo et al. | |
| 5,104,433 A | 4/1992 | Chapin et al. | |
| 5,770,155 A | 6/1998 | Dunphy et al. | |
| 5,850,498 A * | 12/1998 | Shacklette et al. ............ | 385/129 |
| 5,940,209 A | 8/1999 | Nguyen | |
| 5,949,219 A | 9/1999 | Weiss | |
| 6,002,240 A | 12/1999 | McMahan et al. | |
| 6,143,440 A | 11/2000 | Volz et al. | |
| 6,174,604 B1 * | 1/2001 | Akita et al. ................... | 428/392 |
| 6,380,710 B1 | 4/2002 | Watanabe et al. | |
| 6,384,607 B2 | 5/2002 | Horie et al. | |
| 6,531,522 B1 | 3/2003 | Winningham | |
| 6,531,847 B1 | 3/2003 | Tsukamoto et al. | |
| 7,283,216 B1 | 10/2007 | Geng et al. | |
| 7,545,119 B1 | 6/2009 | Egan et al. | |

(Continued)

FOREIGN PATENT DOCUMENTS

| | | |
|---|---|---|
| JP | 64-001934 | 1/1989 |
| JP | 01-219612 | 9/1989 |

(Continued)

OTHER PUBLICATIONS

Office Action dated Dec. 17, 2010 as received in related U.S. Appl. No. 12/895,544.

(Continued)

*Primary Examiner* — Nicholas P D'aniello
(74) *Attorney, Agent, or Firm* — Maschoff Brennan

(57) ABSTRACT

Techniques associated with energy storage devices are generally described. An example energy storage device includes a battery integrated with a sensor such as an optical waveguide. The sensor can be arranged in contact with an outer wall of the battery and can be configured to detect a safety condition associated with the battery.

22 Claims, 5 Drawing Sheets

(56) References Cited

U.S. PATENT DOCUMENTS

| | | | |
|---|---|---|---|
| 8,097,352 B2* | 1/2012 | Fuse | 429/90 |
| 2003/0103552 A1 | 6/2003 | Chi et al. | |
| 2003/0231996 A1 | 12/2003 | Shiu et al. | |
| 2008/0018903 A1* | 1/2008 | Bao et al. | 356/477 |

FOREIGN PATENT DOCUMENTS

| | | |
|---|---|---|
| JP | 04-353731 | 12/1992 |
| JP | 05-272920 | 10/1993 |
| JP | 11-287626 | 10/1999 |
| JP | 2000-173676 | 6/2000 |
| JP | 2001-051166 | 2/2001 |
| JP | 2002-289265 | 10/2002 |

OTHER PUBLICATIONS

Office Action dated Apr. 6, 2011 as received in related U.S. Appl. No. 12/895,494.

Office Action dated Dec. 17, 2010 as received in related U.S. Appl. No. 12/895,494.

Office Action dated Apr. 6, 2011 as received in related U.S. Appl. No. 12/895,544.

"Polyimide varnish U-varnish," Ube Industries Ltd., pp. 1-3, accessed at http://www.ube-ind.co.jp/japanese/products/fine/fine_01_04.htm, last accessed on Jul. 13, 2012.

"Technology to enable three-dimensional design," accessed at http://www.sijapan.com/issue/2007/10/u3eqp30000016ouq.html, accessed on May 15, 2012, pp. 15.

"For forming the coating film / heat-resistant insulation ~ ~ polyimide varnish," accessed at http://www.istcorp.jp/div_cp_var_pyr.htm , accessed on Jul. 13, 2012.

Udd, E. "Fiber Optic Sensors—An Introduction for Engineers and Scientists," Wiley-Interscience, pp. 447-449, 2006.

"Environmental future of the car 28 times," accessed at http://tabi-g.com/sigoto/sub0a028.html, accessed on Jul. 13, 2012.

"Lithium-ion battery ," accessed at www.geocities.jp/hiroyuki0620785/battery/lithiumion.htm, accessed on May 15, 2012, pp. 2.

Murase, T. et al., "Development of Small Diameter Optical Fiber," vol. 53, No. 1, pp. 32-36, 2003.

Kusunoki, S. et al., "Development of Bending Loss Insensitive Fiber for 5 mmR," 105, pp. 33-37, Oct. 2008.

"Development of optical fiber radius 2mm NTT, Bend. "Folded" "freely also" signed "and" bending," accessed at http://bb.watch.impress.co.jp/cda/news/11728.html, updated on Aug. 11, 2005, pp. 7.

Hirose, Naohiro et al., "Optical Component Coupling using Self-Written Waveguides," Integrated Optics: Devices, Materials, and Technologies VIII, edited by Yakov Sidorin, Ari Tervonen, Proceedings of SPIE vol. 5355 (SPIE, Bellingham, WA, 2004), pp. 206-214.

Yamashita, Tatsuya et al., "Light-induced Self-written Waveguides for Large Core Optical Fiber Modules," Active and Passive Optical Components for WDM Communications V, Proc. of SPIE vol. 6014, 60140M, (2005), pp. 60140M-1-60140M-8.

Machine translation of JP 2002-289265, Oct. 4, 2002.

Related pending patent application U.S. Appl. No. 12/895,494, filed Sep. 30, 2010.

Related pending patent application U.S. Appl. No. 12/895,544, filed Sep. 30, 2010.

International Search Report and Written Opinion for International Patent Application No. PCT/US2010/054735 mailed Jan. 20, 2011.

Battery Association of Japan, Safety Design Guidebook, accessed at http://www.baj.or.jp/frombaj/anzen-guide090430.pdf, dated Mar. 2008, pp. 1-41, Japan.

* cited by examiner

ENERGY STORAGE APPARATUS

CROSS-REFERENCE TO RELATED APPLICATIONS

This application is related to U.S. patent application Ser. No. 12/895,494, filed Sep. 30, 2010, entitled "BATTERY SYSTEM AND BATTERY SAFETY ALARM SYSTEM," and U.S. patent application Ser. No. 12/895,544, filed Sep. 30, 2010, entitled "BATTERY SYSTEM AND BATTERY SAFETY ALARM SYSTEM." The foregoing patent applications are incorporated herein by reference.

BACKGROUND

Unless otherwise indicated herein, the materials described in this section are not prior art to the claims in this application and are not admitted to be prior art by inclusion in this section.

There are many electronic devices available in the market today that can perform many different tasks. Some electronic devices, such as smart phones, can be used for voice communication as well as written communications such as email. Other electronic devices are used for entertainment purposes such as listening to music or watching movies and television shows. Still other electronic devices such as laptop computers can be used for word processing, spreadsheets, email, and the like. While the specific abilities of any given electronic device may vary, these devices typically have a common requirement that they all require power and many of them operate using battery power.

Lithium batteries are often used as a power source for these types of electronic devices for various reasons. Lithium batteries are light and can store a relatively large amount of energy, which allows them to be used for extended periods of time. The use of lithium batteries is also expected in electric vehicles and other applications that may require more energy than smaller handheld devices.

The present disclosure contemplates that while lithium batteries have significant advantages over other battery technologies, lithium batteries also have issues that need to be addressed. In particular, the safety of lithium batteries is an ongoing concern. Organic electrolyte is often used in lithium batteries. Unfortunately, organic electrolyte is volatile and flammable. When a battery is overcharged or if impurities have become mixed in the anode or cathode material, binder, conductive agent or other battery component, the battery often gets hot. When the lithium battery becomes hot, the internal pressure rises and the safety of the battery can be an issue. For example, the battery may swell and burst or catch fire. These potential safety issues can cause serious injury.

SUMMARY

Embodiments of the present disclosure generally relate to energy storage devices. In some examples, the energy storage device can include a battery and a sensor. The battery has an outer wall extending between opposing ends of the battery. The sensor, which may be an optical waveguide, can be arranged in contact with at least a portion of the outer wall of the battery. The sensor can be configured to detect a safety condition associated with the battery.

Example energy storage devices may also include a source that is configured to generate an optical signal. The optical signal can be transmitted through the sensor and an intensity level associated with the optical signal exiting the sensor can be detected. When the intensity of the sensor's output signal is determined to be below a threshold or outside of a normal or expected range of thresholds, a safety condition is detected and a notification can be issued relative to the safety condition.

In some embodiments, a method for forming an energy storage device is generally described. An outer wall of a battery is first coated with a light-curable material. A portion of the first coating can be cured to form a core layer of an optical waveguide and is positioned at a predetermined distance from the outer wall. An uncured portion of the first coating can then removed. The cured portion is next coated with a second coating, a portion of which is cured to form a cladding layer over the core layer.

In various embodiments, a method for monitoring an energy storage device is generally described. An optical signal having a substantially constant intensity can be emitted into an optical waveguide that is located on an outer wall of a battery. An intensity of the optical signal can be transmitted through the optical waveguide, and subsequently detected. A notification to indicate a safety condition associated with the battery can be triggered when the intensity is determined to fall below a predetermined intensity threshold.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
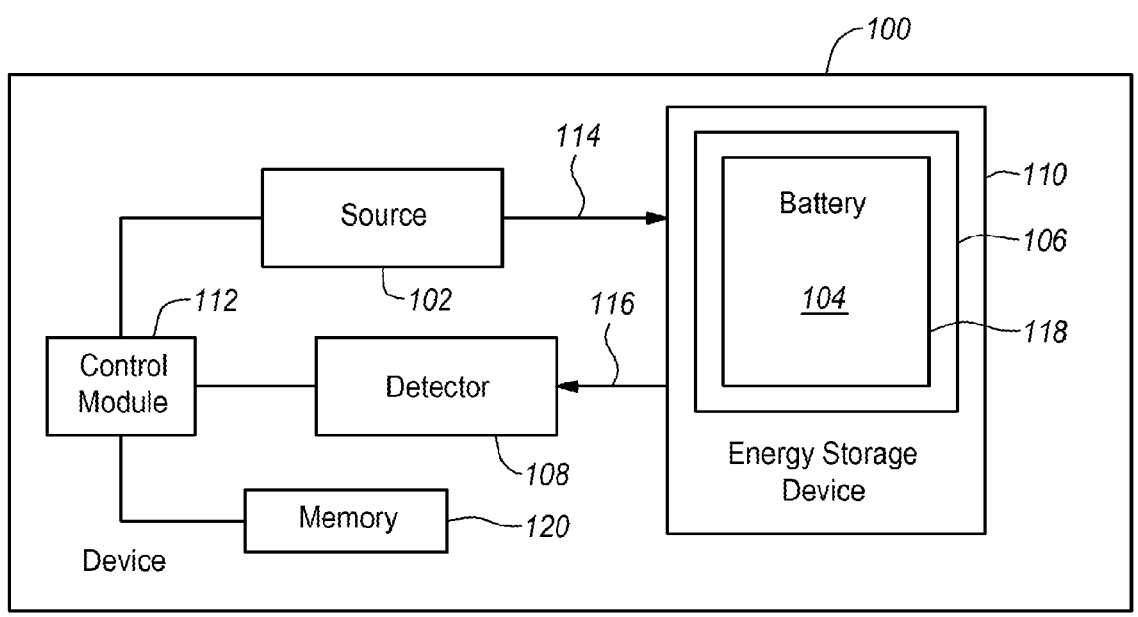
FIG. 1 shows a block diagram of a device that includes an energy storage device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Embodiments of the disclosure generally relate to energy storage devices and more particularly to sensing battery conditions including conditions that may pose safety issues. Embodiments of the disclosure may also include a sensor that can be used to identify certain battery conditions. When these conditions are detected, notifications can be generated to notify users of the battery conditions or to initiate device implemented solutions to the detected conditions.

Conditions such as an increase in internal pressure or changes in the dimensions of the battery can be detected. Detection of these conditions results in the generation of a notification that the battery may be in a potentially unsafe condition. The notification enables actions to be taken to prevent the unsafe condition from continuing or to remedy the unsafe condition or provide notification regarding the unsafe condition. For example, various actions, such as reducing power consumption or shutting of the device, can be taken to prevent the battery from exploding, burning, bursting, or otherwise being in a dangerous condition.

In one example, the sensor includes an optical waveguide formed on the battery's casing or housing. If the battery expands for any reason (e.g., internal heat generation, defect-induced change in the battery), the external dimensions of the battery change. The lateral pressure exerted on the optical waveguide by the change in dimensions changes the transmission characteristics of the optical waveguide. The change in the signal transmitted through the optical waveguide may indicate that an unsafe condition has been detected.

FIG. 1 shows a block diagram of a device 100 that includes an energy storage device 110 that is arranged in accordance with at least some embodiments described herein. The device 100 is representative of various devices including, but not limited to, mp3 players, video players, cellular phones, smart phones, personal digital assistants (PDA), laptop or notebook computers, net book computers, radios, Internet-connected devices, other handheld or electronic devices, or the like or any combination thereof. In another example, the device 100 may represent a battery pack that is included in another object. The device 100, for instance, may be a battery pack that is used in an electric car.

The energy storage device 110 is representative of a device capable of storing energy and includes a battery 104, such as a rechargeable battery (e.g., a lithium type of battery). The energy storage device 110 is not limited to rechargeable batteries, and may include other types of energy storage devices. The energy storage device 110 may include multiple cells that are coupled in series and/or in parallel. The energy storage device 110 may also include multiple independently packaged energy storage devices.

The energy storage device 110 may include the battery 104 and a sensor 106. The sensor 106 can be configured to detect changes in the battery 104 that may indicate a problem associated with the battery 104, such as a safety issue. The battery 104 can be shaped to be cylindrical, rectangular, or some other shape. In some examples, the sensor 106 can be integrated into the energy storage device 110 such that the sensor 106 cannot be separated from the battery 104. In one example, the sensor 106 is placed or formed on at least a portion of an outer surface or wall 118 of the battery 104. As a result, any change in the shape of the battery 104 or the outer wall 118 of the battery 104 may also occur in the sensor 106 or be reflected in the sensor 106 or in an output of the sensor 106. More specifically, the sensor 106 can be configured to detect changes in the physical dimensions of the battery 104.

The energy storage device 110 can be coupled to a source 102 and a detector 108. The source 102 and the detector 108 can be adapted to interface with a control module 112 (e.g., a processor of the device 100). The control module 112 can be configured to direct the source 102 to generate a signal 114 that is coupled to or through the sensor 106. An output signal 116 of the sensor 106 can be received by the detector 108. The control module 112 can be configured to interpret the output signal 116 received by the detector 108. Changes in the output signal 116 may reflect changes in the dimensions of the battery 104, which may reflect increasing internal pressure in the battery 104.

The control module 112 can be configured to interpret the output signal 116 using predetermined information stored in a memory 120 of the device 100. The memory 120 may be adapted to store data identifying a normal range of operation associated with the device 100 as could be identified with the output signal 116, for example. Alternatively, the output signal 116 can be calibrated once the energy storage device 110 is ready for use in the device 100. For example, when the battery 104 is operating normally, the control module 112 can be adapted to measure the output signal 116 of the sensor 106 using the detector 108. This measurement of the output signal 116 can be used determine a normal range of operation for the device 100 as is indicated by a range of values associated with the output signal 116 for normal operation of the battery 104. The temperature of the battery 104, for instance, may be monitored during calibration to ensure that the data stored in the memory 120 during calibration reflects normal operation of the battery 104 or more generally of the energy storage device 110. Alternatively, the calibration can be performed at a previous time such that the device 100 is preloaded with data reflecting normal operation of the energy storage device 110.

The control module 112 can be configured to monitor the output signal 116 of the sensor 106. The monitoring can be performed according to a predetermined schedule, during use of the device 100, according to sensed temperatures of the battery 104, or the like or any combination thereof.

When the output signal 116 of the sensor 106 changes or is determined to be outside of what is considered to be a normal range of operation, the control module 112 may generate a notification indicating a potential issue with the energy storage device 110. In response to the notification, the device 100 may take corrective action where possible. Examples of corrective action may include issuing a notification (e.g., an aural notification using the sound capabilities of the device 100, a visual notification such as displaying text on a display of the device, etc.) to the user, performing actions that reduce demand on the battery, shutting off the device 100, or the like or any combination thereof.

Figure 2:
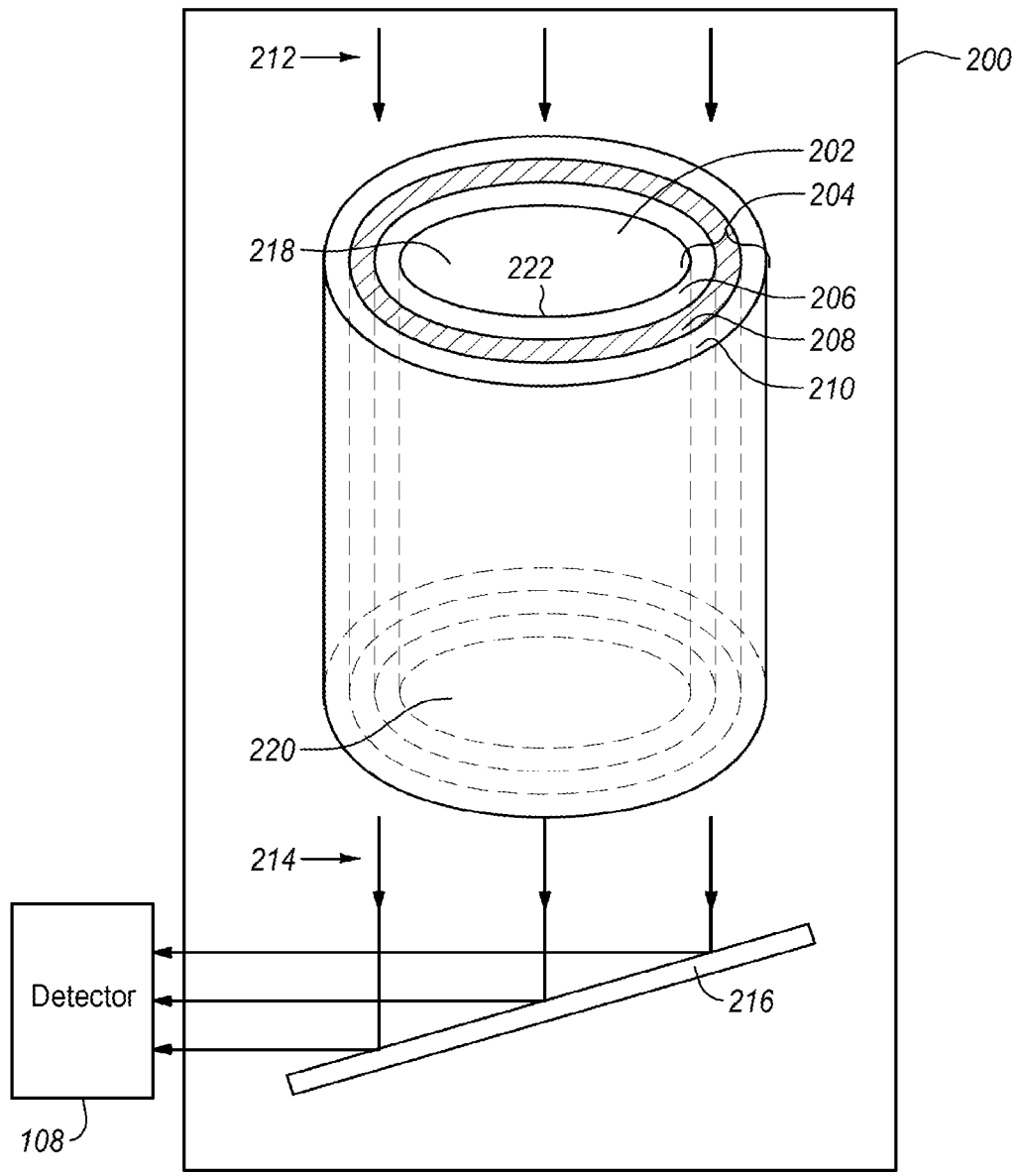
FIG. 2 shows an illustrative example of an energy storage device.

FIG. 2 shows an illustrative example of an energy storage device 200 that is arranged in accordance with at least some embodiments described herein. The energy storage device 200 is an example of the energy storage device 110. The energy storage device 200 includes a battery 202, which is an example of the battery 104, and a waveguide 204, which is an example of the sensor 106. The waveguide 204 can be formed on an outer wall 222 of the battery 204, but typically not on a top region 218 or bottom region 220 of the battery 202. However, the waveguide 204 can be formed on any region or surface of the battery 204 or on multiple surfaces or sides of the battery 204. In addition, the waveguide 204 may be formed on a portion of a surface in some examples.

The waveguide 204 may include a plurality of layers including an inner cladding layer 206, a core layer 208, and an outer cladding layer 210. An input 212 to the energy storage device 200 may be an optical signal that is coupled to the waveguide 204 from a source 102. The input 212 can be coupled to the core layer 208 of the waveguide 204. In this example, the waveguide 204 can be formed about the cylindrical portion of the battery 204 and the core layer 208 can be exposed at the top region 218 of the battery 202.

The input 212, which may be an optical signal, may be conveyed to the core layer 208 via an optical fiber, for example. An end of the optical fiber can be arranged such that the signal exiting the optical fiber is coupled to the waveguide 204 and more particularly to the core layer 208. The input 212 can be coupled at multiple locations in the core layer 208 that is exposed at the top region 218 of the battery 204. The core layer 208, for instance, may have a numerical aperture on the order of 0.15, although other numerical apertures are also contemplated.

The arrangement of the layers 206, 208, and 210 are configured to ensure that the input 212 is guided within the waveguide 204. The input 212 exits the waveguide 204 as an output signal 214. The output signal 214 can be coupled to the detector 108 directly or using a reflective element 216 such as a mirror. The reflective element 216 may also be configured to focus the light on the detector 108. The detector 108 may be a photodetector that is configured such that an output of the photodetector depends on an intensity of the detected light or optical signal. The optical signal in the waveguide 204 can exit the waveguide 204 as a ring of light, although this configuration may change depending on the shape of the battery 204 and/or the configuration of the waveguide 204. Changes in the output signal 214 may indicate a safety issue with the energy storage device 200.

The core layer 208 has a transmittance that is reflected in the output signal 214. In other words, an intensity of the output signal 214 depends on the transmittance of the core layer 208. The intensity of the output signal 214 as measured by the detector 108 is thus a reflection of the transmittance of the waveguide 204. When the dimensions of the battery 204 change (e.g., the shape of the outer wall of the battery deforms), the physical characteristics of the waveguide 204 are changed as well. The change in dimensions of the battery 202 can be reflected in the transmittance of the waveguide 204, which can be detected as a change in the intensity of the output signal 214.

For example, increasing internal pressure in the battery 202 can exert a lateral pressure that expands the dimensions of the battery 202 and that exerts pressure on the waveguide 204. The lateral pressure on the waveguide 204 and/or change in dimensions of the battery 202 can change the transmission characteristics of the waveguide 204. Typically, the transmission characteristics become worse. As a result, monitoring the output signal 214 enables potentially unsafe conditions in the battery 202 to be detected.

Figure 3:
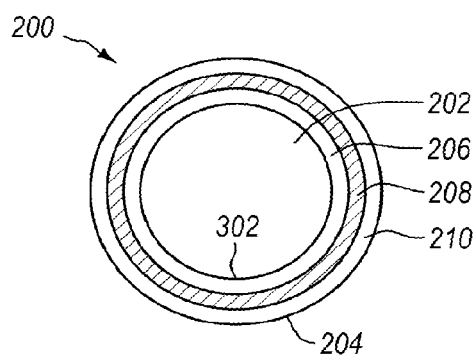
FIG. 3 shows an illustrative example of a top view of the waveguide in a normal condition.

FIG. 3 shows an illustrative example of a top view of the waveguide 204 in a normal condition, configured in accordance with at least some embodiments described herein. FIG. 3 illustrates that the waveguide 204 can be located on an outer surface or wall 302 of the battery 202. The waveguide 204, as previously stated, may be an integral part of the energy storage device 200 and may be formed on or tightly bonded to the outer wall 302 of the battery 202 such that changes to the battery 202 (e.g., changes in dimension) can be detected by the waveguide 204.

In FIG. 3, the battery 202 is cylindrically shaped, although other battery shapes are within the scope of the present disclosure, including square, rectangular, round, or other shape. The waveguide 204 can be located about the cylindrical wall 302 in this example. The waveguide 204 may be configured such that the optical signal enters from one side (e.g. a top region) of the battery 202 and exits the other side (e.g., a bottom) of the battery 202. Thus, the waveguide may be configured to extend lengthwise along the outer wall 302 from opposing ends (the top region and the bottom region of the battery 202).

Although FIG. 3 illustrates an inner cladding layer 206, the outer wall 302 of the battery 202 may have characteristics that permit the outer wall 302 (or a portion thereof) to serve as an inner cladding layer for the core layer 208. In generally, the index of refraction of the core layer 208 is different than the indices of refraction of the inner cladding layer 206 and of the outer cladding layer 210. This ensures that an optical signal can be guided by the core layer 208 from an input of the core layer to an output of the core layer.

Figure 4:
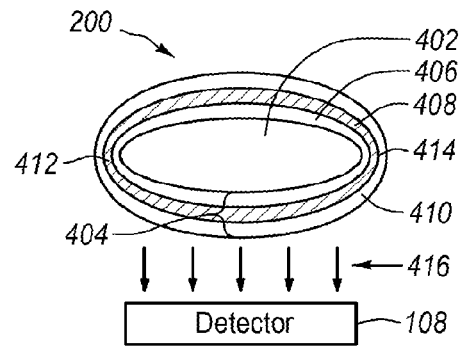
FIG. 4 shows an illustrative example of the battery and the waveguide in a distressed condition.

FIG. 4 shows an illustrative example of the battery 402 in a distressed condition, in accordance with at least some embodiments described herein. FIG. 4 illustrates the energy storage device 200 in a distressed condition and uses different reference numerals to distinguish between the normal condition and the distressed condition. As previously stated, various conditions may cause the battery 402 to become distressed (e.g., overheating, overcharging, impurities, etc.). FIG. 4 illustrates that the battery 402 has expanded and changed shape (e.g., a bulge in a battery wall). This is illustrated in this example by the elliptical shape of the battery 402, although the specific shape of the battery 402 that is under stress (e.g., from heat or increasing internal pressure) may be different and may depend on the specific configuration of the battery 402.

When the battery 402 changes shape (e.g., expands, swells, bulges, etc.), the waveguide 404 is also affected because it is an integral part of the energy storage device 400. FIG. 4 illustrates that the inner cladding layer 406, the core layer 408, and the outer layer 410 have a different shape, configuration, and/or orientation under certain conditions. These changes cause the dimensions of at least the core layer 408 to be altered. For example, swelling of the battery 402 may cause at least the core layer 408 to be thinner at locations 412 and 414. The changes in the dimensions of the battery may alter the signal path of the waveguide 404.

The change in dimensions in the battery 402 has a corresponding impact on the transmission characteristics of the core layer 408. As a result, the output signal 416 of the waveguide 404 can be different from the output signal 214 of the waveguide 204 when the battery 202 is operating normally or operating within a normal range. The change in the output signal 416 can be determined from the detector 108. For example, the control module 112 may be configured to determine that the optical strength of the output signal 416 is below an expected or normal strength and thus output an indicator signal that indicates that the battery 402 may be under stress or causing a potential safety issue. The control module 112 can also determine that there may be a problem with the battery 402 by comparing the intensity of the output signal 416 with the intensity of the output signal 214.

Figure 5:
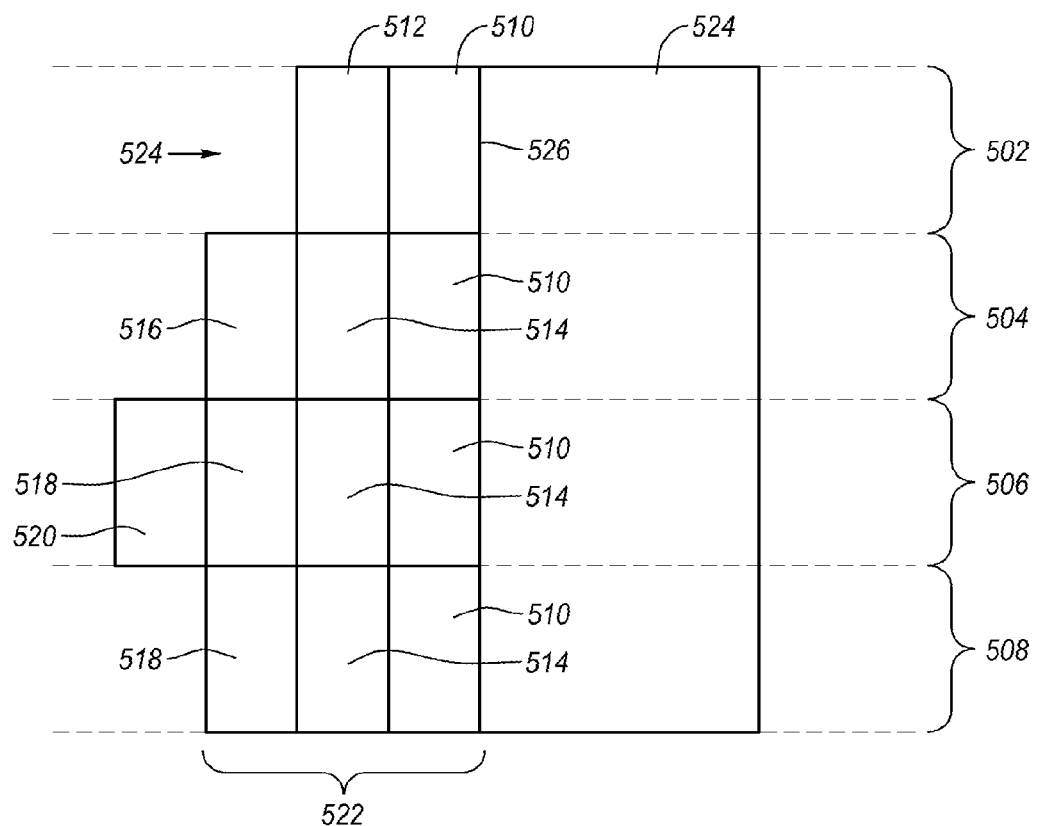
FIG. 5 shows an illustrative example of the formation of a waveguide on a battery.

FIG. 5 shows an illustrative example of the formation of a waveguide 522 on a battery 524 that is arranged in accordance with at least some embodiments described herein. The waveguide 522 is an example of the sensor 106 and of the waveguide 204. FIG. 5 illustrates the formation of the waveguide 522 in stages. Each stage typically involves the deposition of a resin on an outer wall 526 of the battery or on the recently formed layer of the waveguide 522. The resin can then be at least partially cured. More specifically, the resin can be irradiated at a predetermine position in the thickness direction to cure at least a portion of the resin. The uncured resin can be removed. This process can be repeated until the waveguide 522 is formed on at least a portion of the outer wall of the battery 524.

Stage 502 illustrates formation of an inner cladding layer 510. Initially, a resin is deposited on the outer wall 526 of the battery 524. The outer wall 526 or a portion of the outer wall 526 may be coated with the resin by a layer forming device. The layer forming device may coat the outer wall 526 injection molding, roll coating, dip coating, electrostatic spraying, or the like. The layer forming device may include one or more containers configured to hold the various resins or resin solvents. The layer forming device may also include an arm that is configured to hold the battery 524. For example, the arm may be controlled to dip the battery 524 into the resin containers and then hold the battery 524 such that the resin can be cured as disclosed herein.

Once the resin is formed or placed on the outer wall 526, at least a portion of the resin is cured with an appropriate light. The light is typically focused on the resin such that the inner cladding layer 510 can be formed while the portion 512 is not cured. In other words, the portion of the resin corresponding to the inner cladding layer 510 can be cured while the portion 512 is not cured in this example. The curing light can be directed in a thickness direction 524 of the resin. The uncured portion 512 of the resin can be removed, for example by washing.

Stage 504 illustrates formation of a core layer 514 about the inner cladding layer 510. In this example, a resin (which may be the same or different from the resin used to form the inner cladding layer 510) can be placed about the inner cladding layer 510 as previously described. The resin can then be partially cured to form the core layer 514 by focusing the curing light on the portion of the resin corresponding to the core layer 514. The portion 516 remains uncured and can be removed by washing.

Stage 506 illustrates formation of an outer cladding layer 518 about the core layer 514. The outer cladding layer 518 can be formed similarly to the inner cladding layer 510 and the core layer 514. The resin can be placed on the core layer 514 and at least partially cured to form the outer layer 518 (the cured portion). The uncured portion 520 of the resin can be removed by washing or other appropriate method.

Stage 508 illustrates the waveguide 522, which includes the inner cladding layer 510, the core layer 514, and the outer cladding layer 518. In this example, the waveguide 522 can be formed on selective surfaces of the battery 524. As previously described, the waveguide 522 may be formed about the cylindrical surface of a cylindrical battery such that the top and the bottom portions of the cylindrical battery do not include the waveguide. In addition, the waveguide 522 at the top and the bottom portions of the waveguide may be processed (e.g., cut, polished, etc.) such that an optical signal can enter and exit the waveguide 522 as necessary to detect changes to the battery 524.

During the curing process, a different wavelength of light can be used to cure the different layers. For instance, a wavelength on the order of 400 nanometers may be selected to cure the core layer 514 while another wavelength can be used to cure the cladding layers 510 and 518. The thickness of the core layer 514 may be on the order of about 50 micrometers while the thickness of the cladding layers can be on the order of 60 millimeters. The length of the waveguide 522 may be on the order of 63 millimeters. These dimensions are provided by way of example only and are not intended to limit the dimensions or configuration of the waveguide 522. In some instances, the dimensions of the layers in the waveguide 522 may be partially determined by a size and or shape of the underlying battery.

As previously mentioned, the various resins can be deposited, for example, by dipping the battery 524 into the resin or the resin solvent. For each layer of the waveguide 500, the battery 524 can be dipped into the resin or the resin solvent, the battery 524 can be removed from the resin, and the resin can then be cured to create the various layers of the waveguide 500. For each layer of the waveguide 500, the uncured resin can be rinsed off or otherwise removed. Alternatively, at least some of the layers in the waveguide 500 may be formed by injection molding. In this case, the battery may be placed in a mold and the resin is injected and cured as disclosed herein.

In some example, the layer forming device may be configured to monitor the process to determine whether an appropriate amount of resin is supplied for each battery or batch of batteries. Thus, the layer forming device may be able to form waveguides on multiple batteries at the same time. The resin may be a liquid light-curing resin such as a fluorinated polyimide resin made from a fluorine-containing alicyclic diamine and alicyclic tetracarbonic dianhydraide by silylation. Alternatively, the resin may be an acrylic-based or epoxy-based light curing resin.

Figure 6:
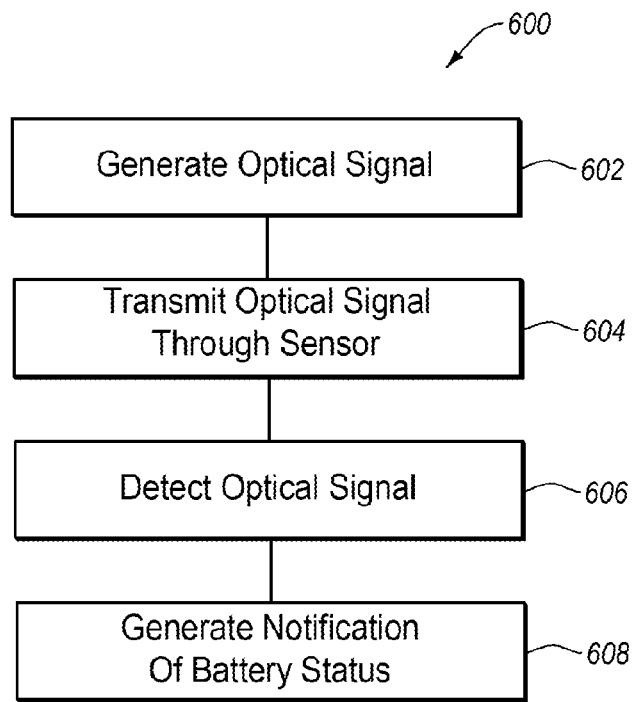
FIG. 6 shows an illustrative example of a method for monitoring an energy storage device.

FIG. 6 shows an illustrative example of a method 600 for monitoring an energy storage device that is arranged in accordance with at least some embodiments described herein. Method 600 includes various operations, functions, or actions as illustrated by one or more of blocks 602, 604, 606, and/or 608. Method 600 may begin at block 602.

In block 602 ("Generate Optical Signal"), a source can be configured to generate an optical signal. When generating the optical signal, the optical signal may be emitted by the source with a substantially constant intensity. By emitting the optical signal with substantially constant intensity, the detector can be more easily identify changes in intensity at the detector. Block 602 may be followed by block 604.

In block 604 ("Transmit Optical Signal Through Sensor"), the device can be configured to transmit the optical signal through the sensor. The emitted optical signal can be transmitted through a sensor such as an optical waveguide. The optical waveguide can be located on an exterior surface or wall of a battery included in the energy storage device. Block 604 may be followed by block 606.

In block 606 ("Detect Optical Signal"), a detector can be configured to detect the optical signal. More specifically, the optical signal exiting the waveguide can be detected by the detector. The detector may determine an intensity of the optical signal. For example, the intensity of the optical signal can be measured over time by the control module such that the output signal of the waveguide is averaged by the control module. Block 606 may be followed by block 608.

In block 608 ("Generate Notification of Battery Status"), the control module can be configured to generate a notification of battery status. A notification of a status of the energy storage device can be generated by the control module. When the intensity of the optical signal is determined to fall below an expected normal range or when the intensity is determined to be different from previous measurements of the intensity of the output signal or when the intensity is determined to fall below an intensity threshold, the notification may trigger an alarm that indicates a safety condition associated with the energy storage device. The notification may be utilized to trigger automatic actions to occur. For instance, the notification may be used to generate a display to a user that the energy storage device (battery) may have a safety issue, turn off the device, or the like. The actions implemented in response to the notification may be configured to reduce removed the condition that caused the notification.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations, or expanded into additional steps and operations without detracting from the essence of the disclosed embodiments.

Figure 7:
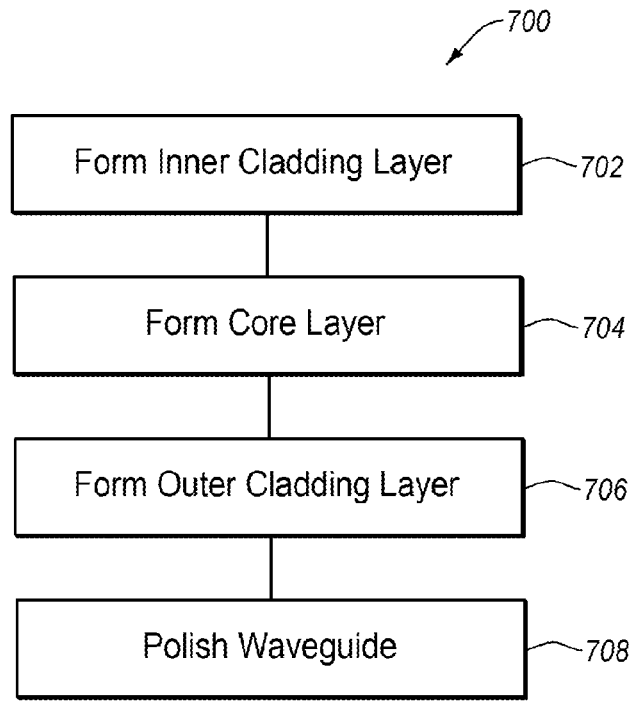
FIG. 7 shows an illustrative example of a method for forming an energy storage device.

FIG. 7 shows an illustrative example of a method 700 for forming an energy storage device that is arranged in accordance with at least some embodiments described herein. Method 700 includes various operations, functions, or actions as illustrated by one or more of blocks 702, 704, 706, and 708. Method 700 may begin at block 702.

In block 702 ("Form Inner Cladding Layer"), a layer forming device can be adapted to form an inner cladding layer. The inner cladding layer can be formed on a battery or other energy apparatus if necessary using the layer forming device. In some instances, the inner cladding layer can be formed by or about an exterior surface or wall of the battery itself. Forming the inner cladding layer can include coating at least a portion of the exterior surface of the battery with a resin and then curing a portion of the resin. The portion of the resin in contact with the exterior surface or wall of the battery can be cured such that the cured portion of the inner cladding layer is in contact with the exterior surface of the battery. In this manner, specific portions of the resin can be cured. The uncured portion of the resin can be removed, for example by washing Block 704 may be followed by block 702.

In block 704 ("Form Core Layer"), the layer forming device can be adapted to form a core layer. The core layer can be formed on or about the inner cladding layer. The core layer can be formed by coating the inner cladding layer with a resin (which may be the same or different from the resin used in forming the inner cladding layer) and then curing a portion of the resin in contact with the inner cladding layer. Often, the resin used to form the core layer can be cured with a curing light having a different wavelength than the curing light used to cure the inner cladding layer. This insures that the core layer has a different index of refraction than the inner cladding layer. The uncured resin may then be removed. When forming the core layer, the curing light can be focused such that the portion of the resin adjacent the inner cladding layer can be cured and the outside portion of the resin coating remains uncured. Block 704 may be followed by block 706.

In block 706 ("Form Outer Cladding Layer"), the layer forming device can be adapted to form an outer cladding layer. The outer cladding layer can be formed on the core layer. The outer cladding layer can be formed in a manner similar to the inner cladding layer. Thus, the core layer can be coated with a resin (which may be the same or different from the resins used in forming the core layer and the inner cladding layer). A portion of the resin in contact with the core layer can then be cured and any uncured resin is removed. In one example, all of the resin used in forming the outer cladding layer can be cured in one example. Block 706 may be followed by block 708

In block 708 ("Polish Waveguide"), a finisher device can be adapted to polish the waveguide. Thus, the waveguide formed by the inner cladding layer, core layer, and outer core layer can be polished. More specifically, the polisher can polish the entrance and/or exit of the waveguide. This may include preparing ends of the waveguide such that an optical signal can be launched or coupled into the waveguide and received out of the waveguide. The ends may be cut and/or polished during this aspect by the finishing device, which may be included in the layer forming device.

Figure 8:
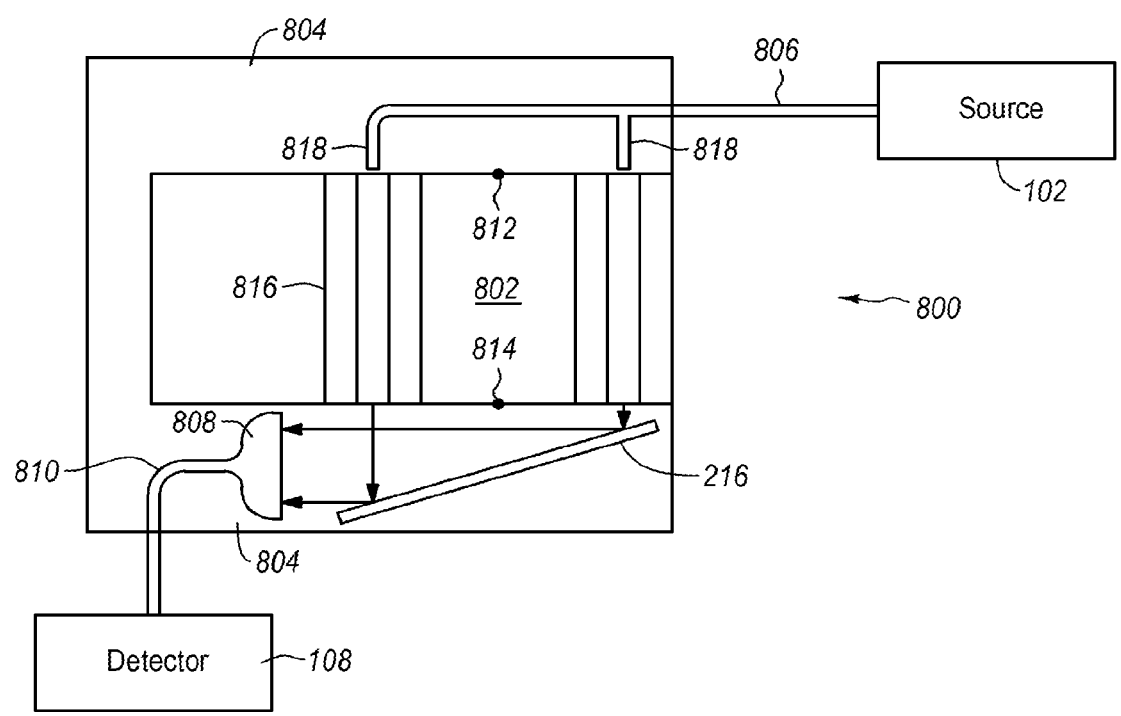
FIG. 8 shows an illustrative of a device that includes an energy storage device mounted in a cage, all arranged in accordance with at least some embodiments described herein.

FIG. 8 shows an illustrative example of a device 800 that includes an energy storage device 802 mounted in a cage 804, in accordance with at least some embodiments described herein. The energy storage device 802 is an example of the energy storage device 110. In this example, the energy storage device 802 can be mounted in the cage 804 of the device 800. The cage 804 may include contacts 812 and 814 that are configured to enable the energy storage device 802 to deliver power to the device 800.

In this example, an optical fiber 806 can be arranged in the cage 804 to deliver an optical signal from the source 102 to the waveguide 816. The optical fiber 806 may be spliced in order to transmit the optical signal to multiple locations in the waveguide 816. In this example, an end 818 of the optical fiber 806 can be placed in sufficient proximity to the end of the waveguide 816 such that the optical signal from the source 102 can be transmitted to the waveguide 816.

When the optical signal exits the waveguide 816, the reflective element 216 may direct the output signal to an aggregator that is configured to funnel the output signal to an optical fiber 810, which is configured to couple the output signal to the detector 108.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. An energy storage device comprising:
   a battery having an outer wall extending lengthwise between opposing ends of the battery; and
   a sensor including an optical waveguide, the optical waveguide extending substantially lengthwise of the battery along at least a portion of the outer wall between the opposing ends, the optical waveguide comprising a core layer positioned between an outer cladding layer and an inner cladding layer, the inner cladding layer arranged in direct contact with at least the portion of the outer wall of the battery, wherein the sensor is configured to detect a safety condition associated with the battery.

2. The energy storage device of claim 1, wherein the core layer comprises a cured resin, the cured resin including one or more of: fluorinated polyimide light-curing resin, acrylic-based light-curing resin, and epoxy-based light-curing resin.

3. The energy storage device of claim 1, wherein an optical transmittance of the core layer is configured to decrease in response to outward-directed pressure exerted on the optical waveguide by outward expansion of the battery.

4. The energy storage device of claim 3, wherein the optical waveguide comprises one or more of:
   a single optical waveguide completely surrounding the outer wall;
   a single optical waveguide surrounding the portion of the outer wall; and/or
   a plurality of optical waveguides distributed at respective locations about the outer wall.

5. The energy storage device of claim 3, further comprising:
   an optical signal source coupled to an end region of the battery and configured to emit an optical signal into the optical waveguide; and
   a detector coupled to an other end of the battery and configured to receive the optical signal after passing through the optical waveguide, and also configured to detect an intensity of the optical signal after passing through the optical waveguide.

6. The energy storage device of claim 1, further comprising:
   a source configured to transmit an optical signal to the sensor; and
   a detector configured to detect an intensity of an output signal of the sensor.

7. The energy storage device of claim 1, wherein a thickness of the core layer is about 50 micrometers and a thickness of the inner cladding layer and of the outer cladding layer is about 60 micrometers.

8. The energy storage device of claim 1, wherein a numerical aperture of the optical waveguide is about 0.15.

9. An energy storage device comprising:
   a battery having an outer wall extending lengthwise between first and second opposing ends of the battery; and
   at least one optical waveguide arranged in contact with at least a portion of the outer wall of the battery and that extends lengthwise of the battery such that a total length of the at least one optical waveguide is substantially the same as a total length of the outer wall from the first opposing end to the second opposing end of the battery.

10. The energy storage device of claim 9, wherein the at least one optical waveguide comprises a core layer positioned between an outer cladding layer and an inner cladding layer, the core layer positioned at a predetermined distance from an outer surface of the outer wall.

11. The energy storage device of claim 10, wherein an optical transmittance of the core layer is configured to decrease in response to outward-directed pressure exerted on the at least one optical waveguide by outward expansion of the battery.

12. The energy storage device of claim 10, further comprising:
   an optical signal source coupled to an end region of the battery and configured to emit an optical signal into the at least one optical waveguide; and
   a detector coupled to an other end of the battery and configured to receive the optical signal after passing through the at least one optical waveguide, and also configured to detect an intensity of the optical signal after passing through the at least one optical waveguide.

13. The energy storage device of claim 12, further comprising a control module configured to control the optical signal source and the detector, wherein the control module is configured to issue a notification when the detected intensity of the optical signal after passing through the at least one optical waveguide is determined to be either below a predetermined threshold or outside of a normal range of operation.

14. The energy storage device of claim 5, wherein the optical signal has a substantially constant intensity.

15. The energy storage device of claim 6, further comprising a control module configured to control the source and the detector, wherein the control module is configured to issue a notification when the detected intensity of the output signal is determined to be either below a predetermined intensity threshold or outside of a normal range of operation.

16. The energy storage device of claim 15, wherein the detected intensity falls below the predetermined intensity threshold or outside of a normal range of operation in response to a decrease in transmittance of the optical waveguide caused by outward expansion of the battery and corresponding deformation of the optical waveguide.

17. The energy storage device of claim 16, wherein the predetermined intensity threshold corresponds to a predetermined pressure outwardly exerted by the battery on the optical waveguide.

18. The energy storage device of claim 15, wherein the notification includes an indication to shut off a device using the energy storage device or to reduce a consumption of the energy storage device.

19. The energy storage device of claim 6, further comprising a reflective element configured to focus the output signal of the sensor onto the detector.

20. The energy storage device of claim 6, further comprising an optical fiber configured to redirect the output signal of the sensor to the detector.

21. The energy storage device of claim 1, wherein a total length of the core layer is substantially the same as a total length of the outer wall from the opposing ends of the battery.

22. The energy storage device of claim 10, wherein the inner cladding layer is in direct contact with at least the portion of the outer wall of the battery and the core layer extends lengthwise of the battery such that a length of the core layer is substantially the same as the length of the outer wall from the first opposing end to the second opposing end of the battery.

* * * * *